March 9, 1948.    F. E. BUXTON    2,437,375
CROSS ARM FOR TRANSMISSION WIRES
Filed May 20, 1944

Inventor:
Frank E. Buxton,
By Heard Smith & Tennant
Attorneys

Patented Mar. 9, 1948

2,437,375

UNITED STATES PATENT OFFICE 2,437,375

CROSSARM FOR TRANSMISSION WIRES

Frank E. Buxton, Wellesley, Mass.

Application May 20, 1944, Serial No. 536,597

9 Claims. (Cl. 174—45)

This invention relates to a novel construction of cross arm designed for attachment to a pole and having for its purpose to support transmission line wires such as are employed in the transmission of electric power, for telegraph and telephone and for other purposes. The object of the invention is to provide a construction which will take the place of the relatively heavy wooden cross arms in general use for such purposes.

The object of the invention is further to provide a construction of cross arm which shall be relatively light in weight and yet shall be of the required strength, which shall be readily manufactured and which shall reduce freight and carrying charges for transportation from the place of manufacture or storage to the place of use.

The object of the invention is further to provide a construction of cross arm the body of which shall be tubular so as to give the required size and strength with the minimum amount of weight and composed of material which shall be nonconductive of electricity, repellent to water and resistant to weather and decay and at the same time shall be suitably reinforced to provide for its proper support upon the pole and for the support of the transmission wires.

More specifically the object of the invention is to provide such a construction in which the tubular body of the cross arm is composed of adhesively bonded, laminated, plastic impregnated, wood veneer having the required properties for the purpose, reinforced by a metal tube in its central section and when required reinforced at the points where the transmission lines are supported.

These and objects and features of the invention will appear more fully from the accompanying description and drawings and will be particularly pointed out in the claims.

The drawings illustrate simple and preferred forms of construction embodying the invention in which, Fig. 1 is a front elevation of a preferred form of construction embodying the invention shown in position attached to a pole with the left-hand portion of the cross arm shown partially in cross section.

The body of the cross arm of this invention is formed as a rigid tube of water repellent, weather and decay resistant and electrically non-conductive material of a length and diameter as required by the load to be supported. This tubular body may be formed in various sizes and of various nonmetallic materials so long as it has the required strength and size and possesses the properties described. Preferably it is formed of an adhesively bonded, laminated, plastic impregnated, wood veneer with the laminations preferably formed as alternately reversely disposed helical strips. Such material is known to those skilled in the art.

These so-called plastic plywoods or plastic impregnated, wood veneer in which certain synthetic resins are now used are highly suitable for this invention. It will be recognized that the art of a thoroughly adhesively bonded, laminated, wood veneer or plywood is constantly developing and that such resins may be varied, even omitted, or other means employed in securing the requisite character of plywood or laminated, wood veneer within the broader scope of the invention.

Figure 1:
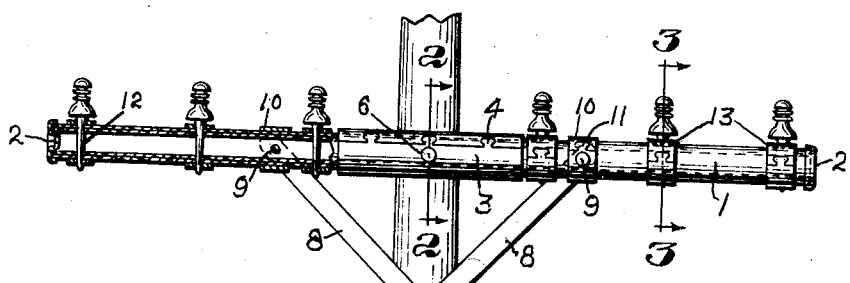
Figure 2:
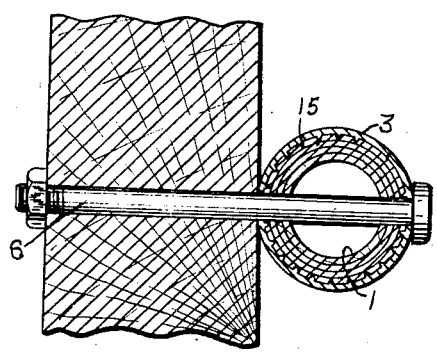
Fig. 2 is a view on a larger scale taken in cross section on the line 2—2, Fig. 1 with the attaching bolt shown in elevation.
Figure 3:
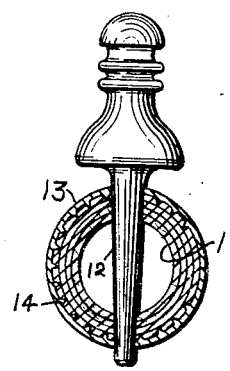
Fig. 3 is a view on a similarly large scale taken in cross section on the line 3—3 of Fig. 1 with an insulator shown in elevation.

In Figs. 1, 2, and 3 the tubular body 1 is indicated as made up and formed of such adhesively bonded, laminated, plastic impregnated, wood veneer. The open ends are provided with suitable closures 2 which may be sheet metal plugs rigidly clamped to the tubular ends. The central section of the tubular body is provided with a rigid tubular metal reinforce in engagement with one wall thereof, and in Figs. 1, 2, and 3 in engagement with the outer wall thereof. In this form this metal reinforce 3 is split longitudinally with one edge presenting tabs or projections 4 interlocking with correspondingly shaped recesses in the other edge. Thus the tubular reinforce may readily be placed around the tubular body and clamped firmly thereto by means of the cooperating interlocking recesses and projections. In the construction shown in Figs. 4 and 5 the tubular metal reinforce 5 is surrounded by and engages the interior wall of the tubular body. In either form, therefore, an extended central section of the cross arm is reinforced and strengthened by the metal tube whether engaging the exterior or the interior wall thereof.

Figure 4:
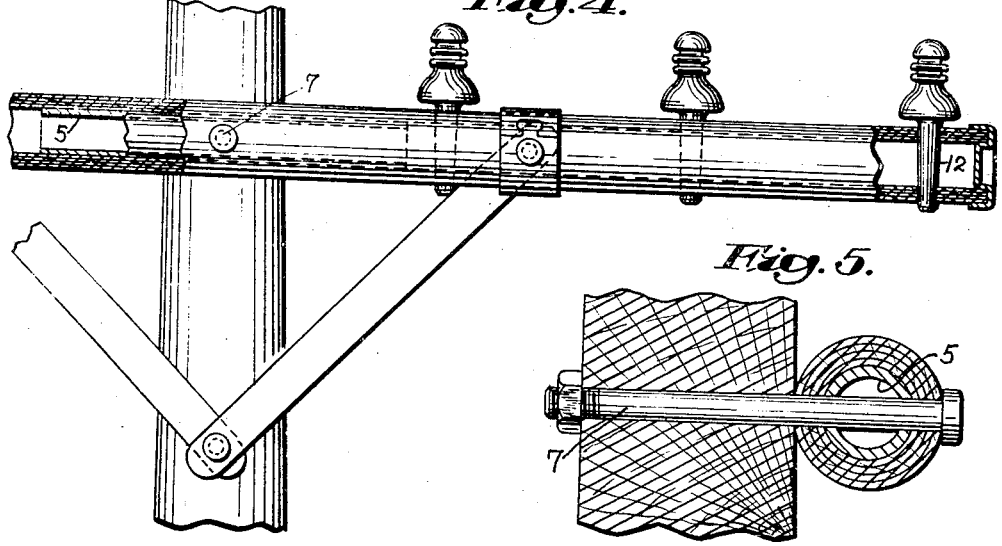
Fig. 4 is a view in elevation of another form of construction embodying the invention with the right-hand end of the cross arm partially in cross section and with the left-hand end chiefly broken away and partially in cross section.
Figure 5:
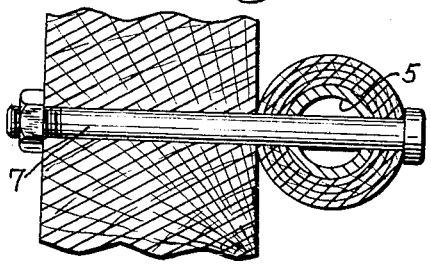
Fig. 5 is a view similar to Fig. 2 showing a variation in construction.

The cross arm is secured at its reinforced central section to the pole by suitable means preferably by a bolt passing entirely through the cross arm and through the pole, such a bolt being shown at 6 in Figs. 1 and 2 and at 7 in Figs. 4 and 5.

In order to retain the cross arm in the required transverse position and suitably braced, the usual metal braces are employed. In Fig. 1 two such braces 8 are shown bolted at 9 at their lower ends to the pole and extending upwardly to the back of the cross arm and bolted thereto by the bolts 9. Preferably reinforcing metal bands 10 split longitudinally in the same manner as the tube 3 and provided with similar co-operating projections 11 and recesses are clamped on the tubular body of the cross arm with the bolts 9 passing therethrough. A similar construction is shown in Fig. 4.

The transmission line wires are carried upon suitable insulators, a preferred form of which is illustrated. These insulators are shown as each having a tapering base pin 12. In the lighter forms of construction the base pin of the insulators may be mounted directly in suitable holes formed in the body of the cross arm as in the construction of Fig. 4. For heavier constructions metal bands 13 similar to the metal bands 10 are clamped to the tubular body at the points where the insulators are located and are provided with holes so that the base pins of the insulators pass through these metal bands and through the tubular body as illustrated in Figs. 1 and 3.

The metal bands act to reinforce the tubular body at the points where the braces are connected and the insulators are mounted. These bands may, therefore, be mounted in engagement with either wall of the tubular body. Preferably, as illustrated at 10 and 13, they are clamped on the exterior wall of the tubular body and when so mounted and constructed they, and the central tubular reinforce 2, are also preferably provided on their inner surface with small pointed projections which are pressed into the outer surface of the tubular body as illustrated at 14 in Fig. 3 and 15 in Fig. 2.

The insulators for supporting the transmission line wires are provded in such number as are required, three being illustrated at each side of the pole. These insulators are mounted in the sections of the tubular body between the tubular metal reinforce and the end closures and out of contact therewith and out of contact with the metal bands when employed at the upper ends of the braces.

For the lighter loads the construction may employ the central metal tubular reinforce, end closures and braces with the insulators mounted directly in the tubular body, for medium loads the metal bands where the braces are connected to the tubular body made be added, and for the heavier loads the metal bands at the insulator supporting points also added.

There is thus presented a light strong and efficient cross arm for transmission line wires which may be made of any required size and length according to the requirements of the load and one which is of great durability being highly repellent to water and resistant to weather and decay and thoroughly electrically nonconductive.

Having thus described the invention, what is claimed as new, and desired to be secured by Letters Patent, is:

1. A pole cross arm support for transmission line wires comprising a rigid tubular body of water repellent, weather and decay resistant, electrically nonconductive material, a rigid tubular metal reinforce extending throughout the central section of the tubular body in engagement with the wall thereof, closures for the ends of the tubular body, a plurality of wire supporting insulators mounted in the sections of the tubular body between the metal reinforce and the end closures, and means for securing the cross arm at its reinforced central section to a pole.

2. A pole cross arm support for transmission line wires comprising a rigid tubular body of water repellent weather and decay resistant, electrically nonconductive, adhesively bonded, laminated, plastic impregnated, wood veneer, a rigid tubular metal reinforce extending throughout the central section of the tubular body in engagement with the wall thereof, closures for the ends of the tubular body, a plurality of wire supporting insulators mounted in the sections of the tubular body between the metal reinforce and the end closures, and means for securing the cross arm at its reinforced central section to a pole.

3. A pole cross arm support for transmission line wires comprising the construction defined in claim 1, together with a plurality of spaced reinforcing bands clamped in engagement with and surrounding the sections of the tubular body between the metal reinforce and the end closures, braces extending from one of said bands at each section to the pole, and in which the said insulators are provided with base pins extending respectively through the other bands and tubular body.

4. A pole cross arm support for transmission line wires comprising the construction defined in claim 1, in which the tubular reinforce is surrounded by and engages the interior wall of the tubular body.

5. A pole cross arm support for transmission line wires comprising a rigid tubular body of water repellent, weather and decay resistant, electrically nonconductive, adhesively bonded, laminated, plastic impregnated, wood veneer, a rigid tubular metal reinforce extending throughout the central section of the tubular body in engagement with the wall thereof, closures for the ends of the tubular body, a plurality of wire supporting insulators mounted in the sections of the tubular body between the metal reinforce and the end closures, means for securing the cross arm at its reinforced central section to a pole, reinforcing bands clamped in engagement with and surrounding the sections of the tubular body between the metal reinforce and the end closures, and braces extending from said bands to the pole.

6. A pole cross arm support for transmission line wires comprising a rigid tubular body of water repellent weather and decay resistant, electrically nonconductive, adhesively bonded, laminated, wood veneer, a rigid tubular metal reinforce extending throughout the central section of the tubular body in engagement with the wall thereof, closures for the ends of the tubular body, a plurality of wire supporting insulators mounted in the sections of the tubular body between the metal reinforce and the end closures, and means for securing the cross arm at its reinforced central section to a pole.

7. A pole cross arm support for transmission line wires comprising a rigid tubular body of water repellent, weather and decay resistant, electrically nonconductive, adhesively bonded, laminated, wood veneer, a rigid tubular metal reinforce extending throughout the central section of the tubular body in engagement with the wall thereof, closures for the ends of the tubular body, a plurality of wire supporting insulators mounted in the sections of the tubular body between the metal reinforce and the end closures, means for securing the cross arm at its reinforced central section to a pole, reinforcing bands clamped in engagement with and surrounding the sections of the tubular body between the metal reinforce and the end closures, and braces extending from said bands to the pole.

8. A pole cross arm support for transmission line wires comprising the construction defined in claim 1, together with reinforcing bands in engagement with the wall of the tubular body at the sections between the metal reinforce and the end closures, and braces extending from each section where reinforced by the band to the pole.

9. A pole cross arm support for transmission line wires comprising the construction defined in claim 1, together with a plurality of reinforcing bands in engagement with the wall of the tubular body at the sections between the metal reinforce and the end closures, and in which the said insulators are provided with base pins extending respectively through the bands and tubular body.

FRANK E. BUXTON.

REFERENCES CITED

The following references are of record in the file of this patent:

UNITED STATES PATENTS

| Number | Name | Date |
|---|---|---|
| 617,062 | Taliaferro | Jan. 3, 1899 |
| 809,743 | Petery | Jan. 9, 1906 |
| 815,506 | Blynt | Mar. 20, 1906 |
| 1,022,993 | Willis | Apr. 9, 1912 |
| 1,181,708 | Welch | May 2, 1916 |
| 2,113,673 | Booker | Apr. 12, 1938 |
| 2,296,781 | Farny | Sept. 22, 1942 |
| 2,351,275 | McConnel | June 13, 1944 |

FOREIGN PATENTS

| Number | Country | Date |
|---|---|---|
| 516,640 | Great Britain | Jan. 8, 1940 |